United States Patent [19]

Kuebler

[11] Patent Number: 5,623,007

[45] Date of Patent: Apr. 22, 1997

[54] REVERSION RESISTANT RUBBER COMPOSITION

[75] Inventor: Thomas P. Kuebler, Uniontown, Ohio

[73] Assignee: Kumho Tire Co., Ltd., Seoul, Rep. of Korea

[21] Appl. No.: 705,011

[22] Filed: Aug. 29, 1996

Related U.S. Application Data

[63] Continuation of Ser. No. 493,325, Jun. 21, 1995, abandoned.

[51] Int. Cl.$^6$ ........................................ C08K 5/34
[52] U.S. Cl. .................. 524/105; 524/104; 524/394; 524/396
[58] Field of Search ............................. 524/104, 105, 524/394, 395

[56] References Cited

U.S. PATENT DOCUMENTS 5,302,315  4/1994  Umland .............................. 252/182.14
5,426,155  6/1995  Hogt et al. .......................... 525/332.6

FOREIGN PATENT DOCUMENTS

WO9207904  5/1992  WIPO .
WO94/29379  12/1994  WIPO .

OTHER PUBLICATIONS

Struktol Activator 73, data sheet (one page), Pub. by Struktol Co., Stow, OH, USA.
"Experimental", p. 6 of brochure Pub. by Akzo N.V.

*Primary Examiner*—Edward J. Cain
*Attorney, Agent, or Firm*—Louis F. Kreek, Jr.

[57] ABSTRACT

Reversion resistance of a sulfur cured aircraft carcass rubber compound is greatly improved by incorporating, as anti-reversion agents, 1.5–6 phr of a mixture of zinc salts of one or more $C_8$–$C_{10}$ aliphatic carboxylic acids and one or more monocyclic aromatic acids, and 0.8–2 phr of a bis-citraconimido compound. Much greater reversion resistance is obtained with a combination of the two anti-reversion agents than with either anti-reversion agent alone.

14 Claims, 1 Drawing Sheet

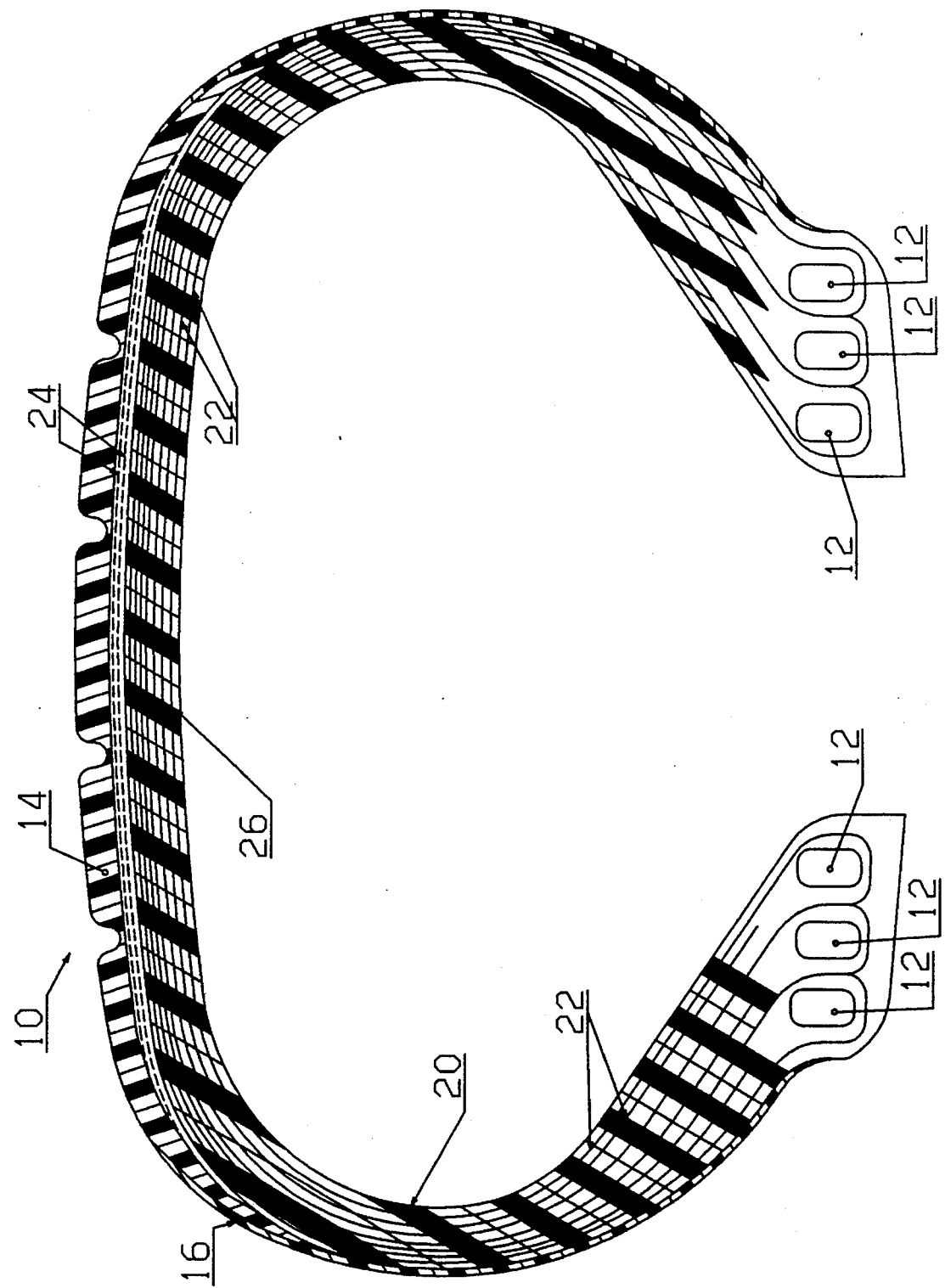

REVERSION RESISTANT RUBBER COMPOSITION

This application is a continuation of application Ser. No. 08/493,325 Jun. 21,1995, now abandoned.

BACKGROUND OF THE INVENTION

1. Field of the Invention

This invention relates to rubber compositions and particularly to rubber compositions having high reversion resistance. More particularly, this invention relates to reversion resistant rubber compositions which are useful as carcass compounds for aircraft tires.

2. Description of the Prior Art

Natural rubber is widely used as the carcass rubber in aircraft tires. While synthetic rubbers dominate the passenger car tire market, the properties of sulfur vulcanized natural rubber compositions (or compounds) including high abrasion resistance, good fatigue resistance and the ability to receive a retread, make natural rubber compositions uniquely suitable for aircraft tire carcass rubbers. Accordingly, natural rubber remains the rubber of choice for this purpose.

Aircraft tires are typically retreaded several times before the tire is discarded. The tread compound will typically wear out in about 200 to 300 landings (roughly 60 to 90 days of average aircraft usage). If the carcass is still sound, which can be ascertained by tests known in the art, the tire is retreaded.

Heat buildup occurs during each landing. Such heat buildup causes devulcanization or reversion of natural rubbber to a sticky, non-crosslinked state in the absence of an anti-reversion agent.

Anti-reversion agents for rubber compositions are well known in the art. These agents are particularly useful in natural rubber compositions, since natural rubber has a greater tendency to devulcanize under heat than do most synthetic rubbers.

U.S. Pat. No. 5,302,315 discloses, as vulcanization activators and materials for retarding devulcanization of rubber, a mixture of zinc salts of (i) one or more aliphatic or cycloaliphatic carboxylic acids containing 6–18 (preferably 8–12) carbon atoms and (ii) an aromatic (preferably monocyclic aromatic) acid. Example 1 of the patent discloses a zinc salt mixture which is the reaction product of 1.0 mole of zinc oxide, 1.4 moles of a $C_8$–$C_{10}$ coconut fatty acid and 0.6 mole of benzoic acid, having a drop point of 100° C.

PCT International Publication No. WO92/07904 (published application No. PCT/EP91/02048) discloses certain bis-citraconic imides as anti-reversion agents for rubber.

SUMMARY OF THE INVENTION

This invention provides novel reversion resistant rubber compositions containing a synergistic combination of two anti-reversion materials which together impart a much greater reversion resistance than is achieved with either material alone.

The term "reversion" is used in its art-recognized meaning to denote devulcanization, or reduction in crosslink density.

This invention according to one aspect provides a novel sulfur vulcanizable rubber composition comprising:

(a) a rubber or mixture thereof; and
(b) as anti-reversion agents,
(1) about 1.5 to about 6 phr of a homogeneous mixture of zinc salts of the following acids: (i) at least one carboxylic acid of the formula RCOOH wherein R is a radical selected from the group consisting of an alkyl group having 5 to 17 carbon atoms and a cycloalkyl group having 5 to 17 carbon atoms, and (ii) at least one unsubstituted or substituted aromatic carboxylic acid, wherein the molar ratio of component (i) to component (ii) is within the range of 1:19 and 19:1, and
(2) about 0.8 to about 2 phr of a compound of the following formula (I) or mixture thereof:

$$Q_1\text{-}D\text{-}(Q_2)_n \qquad (I)$$

wherein:

$n$ is 1, 2 or 3;

D is a monomeric or oligomeric divalent, trivalent or tetravalent group containing at least one carbon atom and may optionally contain one or more hetero atoms or radicals selected from the group consisting of nitrogen, oxygen, silicon, phosphorus, boron, sulfone and sulfoxy; and $Q_1$ and $Q_2$ may be the same or different and each is independently selected from the group consisting of formulas (II) and (III):

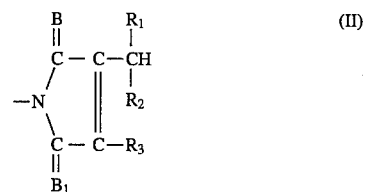

(II)

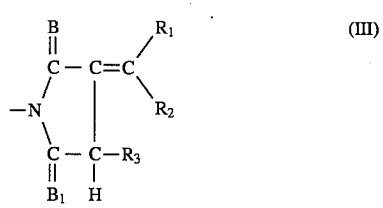

(III)

wherein $R_1$, $R_2$ and $R_3$ are independently selected from the group consisting of hydrogen, $C_1$–$C_{18}$ alkyl groups, $C_3$–$C_{18}$ cycloalkyl groups, $C_6$–$C_{18}$ aryl groups, $C_7$–$C_{30}$ aralkyl groups and $C_7$–$C_{30}$ alkaryl groups, and $R_2$ and $R_3$ may combine to form a ring when $R_1$ is hydrogen; and B and $B_1$ are independently selected from the group consisting of oxygen and sulfur.

This invention according to another aspect provides a sulfur vulcanized rubber composition which is a vulcanizate of the foregoing sulfur vulcanizable rubber composition.

This invention according to a still further aspect provides a tire having a carcass comprising a plurality of cords embedded in a rubber matrix, wherein the matrix rubber is a vulcanized rubber composition as described above.

Vulcanized rubber compositions of this invention have a very high resistance to reversion. Reversion resistance is markedly and unexpectedly greater than that achieved with either of the above-described anti-reversion agents alone. This invention is particularly useful in inhibiting reversion of natural rubber, which in the absence of an anti-reversion agent is quite susceptible to devulcanization.

BRIEF DESCRIPTION OF THE DRAWINGS

In the drawings, the sole FIGURE is a diagrammatic cross-sectional view of an aircraft tire which embodies a carcass rubber having a composition according to this invention.

DESCRIPTION OF THE PREFERRED EMBODIMENTS

This invention will now be described with reference to specific embodiments, including the best mode and preferred embodiment.

Throughout the specification including the claims, rubber compositions are given in phr, i.e., parts by weight per 100 parts of rubber.

The rubber of sulfur vulcanizable rubber compositions herein may be natural rubber or a synthetic rubber, as for example polyisoprene rubber, styrenebutadiene rubber (SBR), polybutadiene rubber, acrylonitrile-butadiene rubber, ethylene-propylenediene terpolymer (EPDM), isoprene-isobutylene rubber, chloroprene rubber, chlorinated isoprene-isobutylene rubber, and mixtures thereof.

Natural rubber and synthetic polyisoprene rubber, especially natural rubber, are the preferred rubbers. These rubbers are the rubbers most benefitted by the anti-reversion agent combination of this invention.

Vulcanizable rubber compositions of this invention contain, as anti-reversion agents, a combination of (1) about 1.5 to about 6 phr of a mixture of zinc salts of carboxylic acids and (2) about 0.8 to about 2 phr of a compound of the formula (I) or mixture thereof, both as described above.

Mixtures of zinc salts which can be used as the first anti-reversion agent in the practice of this invention are described in U.S. Pat. No. 5,302,315 cited supra.

Preferred mixtures of zinc salts are mixtures of (i) one or more zinc salts of aliphatic carboxylic acids containing 8 to 10 carbon atoms and (ii) a zinc salt of a monocyclic aromatic carboxylic acid, in particular a zinc salt of benzoic acid, 2-methylbenzoic acid or 2-chlorobenzoic acid, preferably benzoic acid. The molar ratio of (i) to (ii) is from about 0.6:0.4 to about 0.8:0.2; a molar ratio of 0.7:0.3 is especially preferred.

A suitable commercially available mixture of zinc salts for use in the present invention is "Struktol Activator" 73, which is commercially available from Struktol Company, Stow, Ohio, U.S.A. According to published information, this material has a dropping point (or drop point) of 100° C., a density of 1.2 g/cm$^3$, and a zinc content of 18 percent (by weight). This material is described in U. S. Pat. No. 5,302, 315 and especially Example 1 thereof.

The preferred amount of the above described mixture of zinc salts of carboxylic acids is from about 3 to about 5 phr.

The second anti-reversion agent for practice of this invention, i.e., a compound of the formula (I) as described above, may be a compound as described in WO92/07904 cited supra. Preferred compounds of this type are bis-citraconimides, i.e., compounds of the formula (II) wherein n is 1 and $Q_1$ and $Q_2$ are the same. Additionally, preferred compounds of this type are those in which D is a bivalent group containing carbon and hydrogen atoms only, and containing from 4 to about 12 carbon atoms. D is preferably an alkylene, arylene or aralkylene group such as tetramethylene, 1,3-phenylene or 1,3-dimethylphenylene.

A commercially available material, useful as the second anti-reversion agent is "Perkalink" 900, which is sold by Akzo N. V. of Arnhem, The Netherlands. "Perkalink" 900 is the compound 1,3-bis(citraconimidomethyl) benzene, which has a melting point of 87° C and the formula (IV):

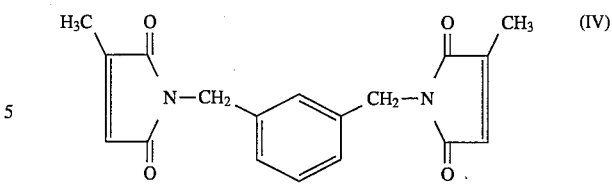

The combination of (1) a mixture of zinc salts of carboxylic acids as above described and (2) a compound of the formula (I) or mixture thereof is a synergistic combination which gives an improvement in reversion resistance far greater than that realized with either compound alone, and indeed far greater than the additive effect of the two anti-reversion agents taken individually.

A particularly preferred combination is a combination of (1) about 1.5–6 phr, especially about 3–5 phr, of (i) zinc salts of $C_8$–$C_{10}$ aliphatic carboxylic acids and (ii) a zinc salt of a monocyclic aromatic acid wherein the molar ratio of (i) to (ii) is from about 0.6:0.4 to about 0.8:0.2, and (2) about 0.8 to about 2 phr of 1,3-bis(citraconimidomethyl) benzene. The preferred anti-reversion agents (1) and (2) are exemplified by "Struktol Activator" 73 and "Perkalink" 900 respectively. Tear resistance of vulcanized rubber compositions of this invention is improved by including in the vulcanization recipe a tear strength improving agent. An agent which has been found to be effective for this purpose is "Promix 4Tear", which is a mixture of polymeric resins and naturally occurring non-toxic polymers, available from Flow Polymers Inc., Cleveland, Ohio, U.S.A. The amount of tear strength improving agent is from about 2 to about 8 phr, preferably from about 4 to about 6 phr. Vulcanized rubber compositions of this invention containing an effective amount of tear strength improving additive have outstanding reversion resistance and tear strengths comparable to those of control compositions (compositions made according to the same recipe but with no anti-reversion agents or tear strength improving additive present, while in the absence of a tear strength improving additive the tear strength of vulcanized rubber compositions of this invention are appreciably lower than those of control compositions.

Vulcanizable rubber compositions of this invention also preferably contain an adhesion promoting agent combination, in order to improve adhesion of the cured rubber to reinforcing cords. This is particularly important when steel cords are used. An adhesion promoting agent combination is less important when nylon cords are used, since satisfactory adhesion between cured rubber and nylon cords is obtained even without an adhesion promoting agent combination.

A preferred adhesion agent promoting combination is a combination of hexamethoxymethyl melamine (HMMM), which is a bonding agent commercially available from Cytec Industries, West Paterson, N.J., U.S.A. under the trade name "Cyrez" 964, and resorcinol-acetaldehyde condensation product, which is a resorcinol donor commercially available from Uniroyal Chemical Company, Inc., Middlebury, Conn., U.S.A. under the trade name "R-6". Both may be used in conventional amounts. The HMMM and the resorcinol-acetaldehyde condensation product react to form a resin for improved adhesion. The combination of HMMM and resorcinol-acetaldehyde reaction product is preferred over the combination of 1-aza-5-methylol-3,7-dioxabicyclo(3,3,0) octane (a methylene donor) and resorcinol-acetaldehyde condensation product (also a known adhesion promoter combination) because the preferred combination gives greater reversion resistance (i.e., longer times to blowout) and lower permanent set.

Other ingredients of a conventional carcass rubber compound for heavy duty tires may be present in conventional amounts. Thus, uncured rubber compositions of this invention may contain conventional reinforcing fillers such as carbon black or a combination of carbon black and silica, cure activators such as stearic acid and zinc oxide, an antioxidant such as polymerized 1,2-dihydro-2,2,4-trimethylquinoline (TMQ), an antiozonant such as N-1,3-dimethylbutyl-N'-phenyl-p-phenylene diamine ("Santoflex" 13), aromatic oil (an extender and processing aid), octyl phenol formaldehyde resin (tackifying resin), and a sulfur cure package which may include, for example, elemental sulfur, a primary sulfenamide accelerator such as N-t-butyl-2-benzothiazyl sulfenamide (TBBS), and a prevulcanization inhibitor such as N-(cyclohexylthio)phthalimide (CTP; "Santogard" PVI). These ingredients and their amounts can be varied by those skilled in the art. The uncured rubber composition can be cured or vulcanized using conventional conditions of time and temperature. Vulcanization temperature may vary from about 100° to about 200° C. (about 212° to about 392° F.). Cure time varies inversely with temperature as is well known. Suitable standard cure conditions include, for example, 45 minutes at 293° F. (145° C.), 75 minutes at 280° F. (138° C.) and 22 minutes at 313° F. (156° C.). The resulting cured rubber composition may be referred to as a sulfur cured vulcanizate.

Vulcanized rubber compositions of this invention have outstanding reversion resistance as already described. As a result, these compositions are uniquely suited for use as carcass rubbers in heavy duty tires. Tear strength is satisfactory when a suitable tear strength improving additive is present. Other physical and mechanical properties, such as tensile strength, modulus, elongation at break, and hardness, are satisfactory.

Vulcanized rubber compositions of this invention are especially useful as carcass rubber compositions for heavy duty tires, such as aircraft tires, tires for off-the-road (OTR) vehicles (earth movers, for example),and tires for heavy duty trucks.

Basically, a tire carcass according to this invention comprises a plurality of cords of a substantially inextensible high modulus material, usually nylon or steel, embedded in a cured rubber matrix, wherein the matrix rubber is a vulcanizate according to this invention. Nylon cords are preferred in aircraft tires. Either nylon or steel cords may be used in other heavy duty tires. A tire incorporating a carcass according to this invention may be built by conventional tire building techniques.

This invention will now be described with reference to the sole figure of drawing. Referring now to the drawing, 10 is a tire according to this invention. This tire includes a plurality of beads 12, a tread 14, sidewalls 16, and a carcass 20 having a plurality of nylon or steel cords 22 and a plurality of nylon or steel breakers 24 embedded in a cured rubber matrix 26. The composition of the rubber matrix is in accordance with this invention. The structure of the tire 10 and all of its components, and the composition of all components except the carcass rubber 26, may be conventional. Accordingly, the structure of the tire will not be described in detail.

EXAMPLES

This invention will now be described in further detail with reference to the examples which follow.

In the following examples, rubber compounding, vulcanization and testing were carried out according to standard methods except as otherwise stated.

Recipes for uncured rubber compositions (or compounds) herein are given in phr. Amounts of ingredients are rounded to the nearest 0.1 phr. Thus, 2.25 phr is given as 2.2, and 3.75 phr is given as 3.8.

The principal tests used herein for testing rubber samples are listed below.

Stress-strain (or tensile) properties, i.e, tensile strength, 100% and 300% modulus, and elongation at break, were determined at room temperature according to ASTM D412-92. Samples were cured and in some cases aged. Cure times and temperatures, and aging conditions where used, are given in each example. Tensile strength and modulus are reported in pounds per square inch.

Reversion was measured using the B. F. Goodrich (BFG) Flexometer according to ASTM D623. Tests were carried out at 195° F. (91° C.). Tests included time (in minutes) to failure (or blowout), blowout temperature and blowout temperature rise (rate of rise in °F./min). Time to failure is indicative of reversion resistance. A number of test samples (rubber samples according to this invention) did not fail. This will be noted in the examples.

Cure characteristics were determined using a Monsanto oscillating disk rheometer ODR) according to ASTM D2084-93. Tests were carried out at 356° F. (180°C.) and one degree of arc. Measurements included maximum torque and mininum torque (both in lb.-in.). Delta torque is maximum torque minus minimum torque. (Delta torque indicates extent of crosslinking). Other measurements: T2 (scorch safety) is the time to 2% of delta torque above minimum torque; 50% cure time, T50, is the time to 50% of delta torque above minimum; and optimum cure, T90, is the time to 90% of delta torque above minimum. All times are in minutes.

Mooney scorch using a long rotor (MSLR) was carried out at a temperature of 257° F. (125° C.) according to ASTM D1646.

Tear strength was measured by the Modified Trouser Tear (MOT) test, ASTM D624. This test is described in A. G. Veith, *Rubber Chemistry and Technology*, vol. 38, no. 5, November 1965, pages 700–718.

COMPARISON EXAMPLE

Anti-reversion agents "Struktol Activator" 73 (herein "A73" ) and "Perkalink" ) 900 were tested individually in natural rubber compositions (or compounds) according to this Comparison Example.

"Struktol Activator" 73 is available from Struktol Company, Stow, Ohio, U.S.A. This material and its use as an anti-reversion agent in rubber compounds are described in U.S. Pat. No. 5,302,315, particularly Example 1 thereof. This material is a mixture of zinc octoate and zinc decanoate (collectively 70 mole percent) and zinc benzoate (30 mole percent). This material has a zinc content of 18%, a density of 1.2 gram/cm³, and a dropping point (or drop point) of 100° C.

"Perkalink" 900 (melting point 87° C.) is 1,3-bis(citraconimidomethyl)benzene, and is available from Akzo N. V., Arnhem, The Netherlands. This and other bis-citraconimides and their use as anti-reversion agents in rubber compounds are described in PCT International Publication No. W092/07904 (application PCT/EP91/02048).

The rubber compounds prepared, cured and tested in this Comparison Example are:

A—Control; no anti-reversion additive.
B—Comparison compound containing A73.
C—Comparison Compound containing "Perkalink" 900.

The compositions of uncured natural rubber compounds A, B and C are given in Table I. All amounts are in parts by weight per 100 parts of rubber (phr).

TABLE I

| Compound | A | B | C |
| --- | --- | --- | --- |
| Natural rubber SMR-10 | 100 | 100 | 100 |
| Carbon black N-330 | 43 | 43 | 43 |
| "Cyrez" 964 (1) | 4.6 | 4.6 | 4.6 |
| R-6 (2) | 3.0 | 3.0 | 3.0 |
| Stearic acid | 2.0 | 1.5 | 2.0 |
| Zinc oxide | 4.0 | 4.0 | 4.0 |
| TMQ (3) | 3.8 | 3.8 | 3.8 |
| DBPPD (4) | 0.5 | 0.5 | 0.5 |
| Aromatic oil | 6.0 | 6.0 | 6.0 |
| A73 | — | 4.0 | — |
| "Perkalink" 900 | — | — | 1.0 |
| Dyph. 8318 (5) | 2.0 | 2.0 | 2.0 |
| Oil treated sulfur (6) | 2.2 | 2.2 | 2.2 |
| Insoluble sulfur | 1.2 | 1.2 | 1.2 |
| TBBS (7) | 0.6 | 0.6 | 0.6 |
| "Santogard" PVI (8) | 0.1 | 0.1 | 0.1 |

Notes:
(1) "Cyrez" 964'= hexamethoxymethyl melamine; bonding agent; reacts with R-6 to form resin for improved adhesion; available from Cytec Industries, West Paterson, New Jersey.
(2) "R-6" = resorcinol-acetaldehyde condensation product; resorcinol donor for resin production for improved adhesion; available from Uniroyal Chemical Company, Middlebury, Connecticut.
(3) TMQ = polymerized 1,2-dihydro-2,2,4trimethyl quinoline; antioxidant
(4) DBPPD ("Santoflex" 13, available from Monsanto Chemical Company, St. Louis, Missouri) = N-1,3-dimethylbutyl-N'-phenyl-p-phenylene diamine.
(5) "Dyph." 8318 = octyl phenol formaldehyde resin; tackifying resin
(6) Oil treated sulfur ("80% Crystex"); crosslinking agent
(7) TBBS = N-t-butyl-2-benzothiazyl sulfenamide; primary sulfenamide accelerator
(8) "Santogard" PVI = N-(cyclohexylthio)phthalimide (CTP); prevulcanization inhibitor (scorch retarder or cure retarder); available from Monsanto Chemical Company, St. Louis, Missouri.

Tests run included stress-strain (tensile); BFG Flexometer blowout (reversion test); oscillating disk rheometer (ODR); and Mooney Scorch, large rotor (MSLR).

Cure conditions for stress-strain test samples were as follows: 45 minutes at 293° F. (145° C.) (standard cure) and 90 minutes at 293° F. (145° C.) (overcure). Cure conditions for BFG Flexometer blowout test samples were: 75 min. (standard) and 150 min. (overcure) at 280° F. (138° C.). ODR and Mooney scorch samples were not cured prior to testing.

Dumbbell-shaped test samples were used for stress-strain tests. Pellets were used for the BFG Flexometer tests.

Both original (unaged) and aged samples were tested in the stress-strain test. Aged samples were aged for 3 days at 212° F. (100° C.).

All stress-strain tests were run at room temperature (RT; about 20°'25° C.).

BFG Flexometer tests were run at 195° F.(91° C.) using a 110 pound (50 kg) load.

Results are shown in Tables II through V.

TABLE II

| Stress-Strain Test Data All tests at RT | | | |
| --- | --- | --- | --- |
| Compound | A | B | C |
| Cure: 45 min at 293° F. (145° C.) | | | |
| Unaged: | | | |
| Tensile strength, psi | 3580 | 3350 | 3540 |
| 100% Modulus, psi | 318 | 426 | 325 |
| 300% Modulus, psi | 1648 | 2104 | 1630 |
| % Elongation at break | 528 | 434 | 538 |
| Aged 3 days at 212° F.: | | | |
| Tensile strength, psi | 1520 | 1410 | 1530 |
| 100% Modulus, psi | 601 | 693 | 677 |
| % Elongation at break | 199 | 171 | 183 |
| Cure: 90 min at 293° F. (145° C.) | | | |
| Unaged: | | | |
| Tensile strength, psi | 2610 | 3180 | 3030 |
| 100% Modulus, psi | 258 | 405 | 309 |
| 300% Modulus, psi | 1328 | 2106 | 1634 |
| % Elongation at break | 462 | 409 | 464 |
| Aged 3 days at 212° F.: | | | |
| Tensile strength, psi | 1450 | 1460 | 1620 |
| 300% Modulus, psi | 512 | 634 | 594 |
| % Elongation at break | 214 | 185 | 209 |

Notes:
min = minutes
RT = room temperature (20–25° C.)
psi = pounds per square inch
These abbreviations have the same meaning throughout the specification.

TABLE III

| Test conditions: 195° F., 25%, 110 lb. | | | |
| --- | --- | --- | --- |
| Compound | A | B | C |
| BFG Flexometer Blowout Time, min Cure: 75 min at 280° F. (138° C.) | | | |
| Time, unaged | 13.0 | 79.5 | 18.6 |
| Time, aged 3 days at 212° F. | 7.0 | 104.4 | 24.5 |
| Cure: 150 min at 280° F. (138° C.) | | | |
| Time, unaged | 5.8 | 33.3 | 12.2 |
| Time, aged 3 days at 212° F. | 5.9 | 49.8 | 29.7 |
| BFG Flexometer Blowout Temperature Rise, °F./min Cure: 75 min at 280° F. (138° C.) | | | |
| Unaged | 9.50 | 1.30 | 6.29 |
| Aged 3 days at 212° F. | 17.14 | 0.86 | 3.55 |
| Cure: 150 min at 280° F. (138° C.) | | | |
| Unaged | 17.93 | 2.37 | 7.86 |
| Aged 3 days at 212° F. | 21.36 | 1.83 | 3.87 |

TABLE IV

Oscillating Disk Rheometer ODR)
Cure time and torque
356° F. (180° C.), 1 degree of arc

| Compound | A | B | C |
| --- | --- | --- | --- |
| Max. torque, lb-in | 25.90 | 31.70 | 25.00 |
| Min. torque, lb-in | 5.50 | 5.00 | 4.60 |
| T2, min | 1.83 | 1.98 | 1.97 |
| T50, min | 2.74 | 3.10 | 2.91 |
| T90, min | 3.75 | 4.40 | 3.87 |

TABLE V

Mooney Scorch at 280° F. (138° C.), Large Rotor

| Compound | A | B | C |
| --- | --- | --- | --- |
| S5, min | 10.42 | 9.75 | 11.0 |
| S35, min | 13.83 | 13.5 | 14.42 |
| Min. torque, lb-in | 37.52 | 33.84 | 32.46 |

Comparison Compound B, containing 4 phr A73, gave a six-fold increase in blowout time vs. Control A. However, aged stress-strain properties were worse.

Comparison compound C, containing 1 phr "Perkalink" 900, showed 50% longer blowout time than Control compound A but much shorter than that of Comparison compound B. Stress-strain properties were not significantly affected.

Example 1

Three natural rubber compounds according to this invention, containing both A73 (Struktol Activator 73) and "Perkalink" 900, were prepared and tested. These are designated as compounds 1, 2, and 3. Also prepared and tested was a second batch of control compound A, having the same composition as control compound A in the Comparison Example except that the natural rubber stock was SMR-20, and a comparison compound D, containing A73 but no "Perkalink" 900.

Compositions are shown in Table VI. All amounts are given in phr. The notes following Table I also apply to Table VI.

TABLE VI

| Compound | A | 1 | 2 | 3 | D |
| --- | --- | --- | --- | --- | --- |
| Natural rubber | 100 | 100 | 100 | 100 | 100 |
| Carbon black | 43 | 43 | 43 | 43 | 43 |
| "Cyrez" 964 | 4.6 | 4.6 | 4.6 | 4.6 | 4.6 |
| R-6 | 3.0 | 3.0 | 3.0 | 3.0 | 3.0 |
| Zinc oxide | 4.0 | 4.0 | 4.0 | 4.0 | 4.0 |
| Stearic acid | 2.0 | 1.5 | 1.5 | 1.5 | 1.5 |
| TMQ | 3.8 | 3.8 | 3.8 | 3.8 | 3.8 |
| DBPPD | 0.5 | 0.5 | 0.5 | 0.5 | 0.5 |
| Aromatic oil | 6.0 | 6.0 | 6.0 | 6.0 | 6.0 |
| A73 | — | 4.0 | 2.0 | 2.5 | 2.5 |
| Perkalink 900 | — | 1.0 | 1.0 | 0.5 | — |
| Dyph. 8318 | 2.0 | 2.0 | 2.0 | 2.0 | 2.0 |
| Oil treated sulfur | 2.2 | 2.2 | 2.2 | 2.2 | 2.2 |
| Insoluble sulfur | 1.2 | 1.2 | 1.2 | 1.2 | 1.2 |
| TBBS | 0.6 | 0.6 | 0.6 | 0.6 | 0.6 |
| Santogard PVI | 0.1 | 0.1 | 0.1 | 0.1 | 0.1 |

Test samples having each of the compositions shown in Table VI were prepared and tested. Tests included: stress-strain (tensile) on unaged and aged samples, BFG Flexometer blowout, oscillating disk rheometer (ODR), and Mooney scorch (large rotor). Stress-strain and BFG Flexometer test samples were cured prior to testing.

Results are shown in Tables VII to X. These tables also show test conditions, and cure and aging conditions where applicable.

TABLE VII

Stress-strain test data.
All tests at RT

| Compound | A | 1 | 2 | 3 | D |
| --- | --- | --- | --- | --- | --- |
| Cure: 45 min at 293° F. (145° C.) | | | | | |
| Unaged: | | | | | |
| Tensile, psi | 3420 | 3440 | 3450 | 3340 | 3600 |
| 100% modulus, psi | 349 | 488 | 465 | 421 | 447 |
| 300% modulus, psi | 1685 | 2126 | 2052 | 1887 | 1997 |
| % Elong. at break | 508 | 446 | 466 | 467 | 484 |
| Aged 3 days at 212° F.: | | | | | |
| Tensile, psi | 1150 | 1270 | 1260 | 1080 | 1240 |
| 100% modulus, psi | 685 | 776 | 815 | 719 | 707 |
| %. Elong at break | 154 | 153 | 144 | 141 | 164 |
| Cure: 90 min at 293° F. (145° C.) | | | | | |
| Unaged: | | | | | |
| Tensile, psi | 2620 | 3190 | 3130 | 3160 | 3120 |
| 100% modulus, psi | 303 | 485 | 443 | 421 | 386 |
| 300% modulus, psi | 1441 | 2159 | 1967 | 1918 | 1769 |
| %. Elong. at break | 458 | 412 | 439 | 448 | 466 |
| Aged 3 days at 212° F.: | | | | | |
| Tensile, psi | 1100 | 1290 | 1260 | 1210 | 1300 |
| 100% modulus, psi | 600 | 768 | 811 | 761 | 652 |
| % Elong. at break | 165 | 154 | 146 | 149 | 176 |

TABLE VIII

BFG Flexometer tests

| Compound | A | 1 | 2 | 3 | D |
| --- | --- | --- | --- | --- | --- |
| A. Blowout time, min. Tests at 195° F. (91° C.) | | | | | |
| Cure: 75 min, 280° F. | | | | | |
| Unaged | 7.4 | 241* | 217# | 70.2 | 21.3 |
| Aged 3 days, 212° F. | 7.3 | 241* | 240# | 38.8 | 26.2 |
| Cure: 150 min, 280° F. | | | | | |
| Unaged | 5.4 | 245* | 15.2 | 8.1 | 19.8 |
| Aged 3 days, 212° F. | 5.7 | 245* | 202# | 64.7 | 39.2 |
| B. Blowout temperature, °F. Tests at 195° F. (91° C.) | | | | | |
| Cure: 75 min, 280° F. | | | | | |
| Unaged | 318 | 264 | 282 | 332 | 294 |
| Aged 3 days, 212° F. | 320 | 264 | 287 | 298 | 298 |
| Cure: 150 min, 280° F. | | | | | |
| Unaged | 319 | 256 | 403 | 326 | 285 |
| Aged 3 days, 212° F. | 301 | 261 | 332 | 304 | 305 |

Notes:
*Test samples did not fail. They were intact at end of test. Test time is rounded to nearest minute.
Rounded to nearest minute.

TABLE IX

Oscillating Disk Rheometer (ODR)
356° F. (180° C.), 1 degree of arc

| Compound | A | 1 | 2 | 3 | D |
|---|---|---|---|---|---|
| Max. torque, lb-in | 26.5 | 31.3 | 30.1 | 29.5 | 30.2 |
| Min. torque, lb-in | 7.1 | 5.9 | 6.3 | 6.3 | 6.5 |
| T2, min | 1.68 | 1.71 | 1.78 | 1.73 | 1.87 |
| T50, min | 2.56 | 2.84 | 2.84 | 2.82 | 2.99 |
| T90, min | 3.72 | 4.54 | 4.28 | 4.42 | 4.44 |
| Reversion res. | 0.27 | 0.09 | 0.12 | 0.17 | 0.29 |

Note: Reversion res. = reversion resistance in in-lb/min

Samples of the preferred compound, compound 1, did not fail. Instead, times were discontinued at the times indicated. Absence of failure after lengthy testing is indicative of outstanding reversion resistance. The full potential of reversion resistance has not yet been realized.

The combination of "Struktol Activator" 73 and "Perkalink" 900 is a synergistic combination giving far greater reversion resistance than would be expected from reversion resistance imparted by either anti-reversion agent alone at the same loading as was used in Compound 1. Results with Compound 1 should be compared with those obtained with Compounds B and C in the Comparison Example.

Compound 2 showed good reversion resistance but the results were less impressive than those obtained with Compound 1.

Results with Compound 3 suggest that a higher loading of "Perkalink" 900 than the 0.5 phr present in this compound is necessary for high reversion resistance.

Tear strength was diminished by the antireversion agent combination. Compounds 1 and 2 showed tear strengths of 92.4 lb-in and 110 lb-in, respectively, in the MOT Trouser tear test, vs. 200 lb-in in Control Compound A. Further tests show that incorporation of a suitable tear strength improving additive greatly improved tear strength without adversely affecting other properties.

Example 2

This example shows that greatly improved tear resistance is achieved without sacrificing other physical properties by incorporating a tear strength improving additive.

Two rubber compounds were prepared and tested in this example. One of these, Compound 4, had the same composition as Compound 1 in Example 1 except for the presence of 4 phr of "Promix 4Tear", which is a commercially available tear strength improving additive available from Flow Polymers, Inc. of Cleveland, Ohio, U.S.A. Preparation and testing of Compound 1 were repeated for comparison purposes.

Results are shown in Table X to XIII.

TABLE X

Stress-strain data
Cure: 45 min at 293° F. (145° C.)
All tests are at RT

| Compound | 1 | 4 |
|---|---|---|
| Tensile strength, psi | 2940 | 2780 |
| 100% Modulus, psi | 495 | 537 |
| 300% Modulus, psi | 1902 | 1816 |
| % Elongation at break | 423 | 421 |

TABLE XI

BFG Flexometer Tests
Cure: 75 min at 280° F.
All samples unaged
Tests at RT

| Compound | 1 | 4 |
|---|---|---|
| Time to blowout, min | 478* | 240* |
| Blowout temp., °F. | 234 | 260 |
| Durometer hardness--Shore A | 70 | 74 |
| Flexometer compression--blowout test: | | |
| Static compression, % | 36.6 | 33.4 |
| Flex. compression, start | 0.249 | 0.227 |
| Flex. compression, final | 0.381 | 0.400 |
| Permanent set, % | 13.2 | 17.3 |

Note:
*No failure

TABLE XII

Oscillating Disk Rheometer (ODR) tests
356° F. (180° C.), 1 degree of arc

| Compound | 1 | 4 |
|---|---|---|
| T2, min | 1.75 | 1.91 |
| T50, min | 3.00 | 3.16 |
| T90, min | 4.68 | 4.80 |
| Max. torque, lb-in | 33.90 | 35.20 |
| Min. torque, lb-in | 6.40 | 6.50 |
| Reversion resistance (1) | 0.076 | 0.098 |

Note:
(1) Units: in-lb/min

TABLE XIII

MOT Tear Test
Cure: 50 min at 293° F.
Test at RT

| Compound | 1 | 4 |
|---|---|---|
| Tear strength, lb-in | 62.5 | 99.1 |
| Knotty tear index, lb-in | 35.9 | 46.5 |

Addition of "Promix 4Tear" markedly increased tear strength without adverse effect on reversion resistance, as shown by comparison of results obtained with Compound 4 with those obtained with Compound 1. Tear strength of Compound 4 is similar to that of control Compound A. Both Compound 1 and Compound 4 showed reversion resistance many times greater than that of Compound A. Samples of Compound 1 and Compound 4 both remained intact after lengthy BFG Flexometer blowout tests. The test of Compound 1 was continued for 478 minutes (nearly 8 hours, and far longer than any previous test) without failure. The test of Compound 4 was continued for 240 minutes (4 hours) without failure. The tests reported in this example do not show whether or not the reversion resistance of Compound 4 equals that of Compound 1, since there was no test specimen failure in either case. This example does show that both Compound 1 and Compound 4 exhibit remarkable reversion resistance compared either to control Compound A (no anti-reversion additive) or to comparison Compounds B and C, each of which contained one anti-reversion additive but not the combination of anti-reversion additives of this invention.

While this invention has been described in detail with reference to specific embodiments thereof, such disclosure is by way of illustration and not limitation.

What is claimed is:

1. A sulfur vulcanizable rubber composition comprising:
   (a) a rubber or mixture thereof; and
   (b) as anti-reversion agents, (1) about 3 to about 5 phr of a homogeneous mixture of zinc salts of the following acids: (i) at least one carboxylic acid of the formula RCOOH wherein R is a radical selected from the group consisting of an alkyl group having 5 to 17 carbon atoms and a cycloalkyl group having 5 to 17 carbon atoms, and (ii) at least one unsubstituted or substituted aromatic carboxylic acid, wherein the molar ratio of component (i) to component (ii) is within the range of 1:19 and 19:1, and (2) about 0.8 to about 2 phr of a compound of the following formula (I) or mixture thereof:

wherein:
   n is 1, 2 or 3;
   D is a monomeric or oligomeric divalent, trivalent or tetravalent group containing at least one carbon atom and may optionally contain one or more hetero atoms or radicals selected from the group consisting of nitrogen, oxygen, silicon, phosphorus, boron, sulfone and sulfoxy; and
   $Q_1$ and $Q_2$ may be the same or different and each is independently selected from the group consisting of formulas (II) and (III):

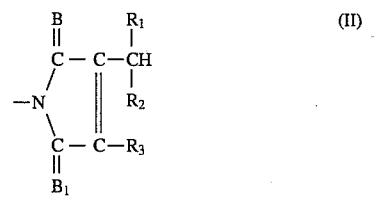

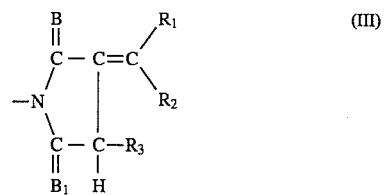

wherein $R_1$, $R_2$ and $R_3$ are independently selected from the group consisting of hydrogen, $C_1$-$C_{18}$ alkyl groups, $C_3$-$C_{18}$ cycloalkyl groups, $C_6$-$C_{18}$ aryl groups, $C_7$-$C_{30}$ aralkyl groups and $C_7$-$C_{30}$ alkaryl groups, and $R_2$ and $R_3$ may combine to form a ring when $R_1$ is hydrogen; and B and $B_1$ are independently selected from the group consisting of oxygen and sulfur.

2. A sulfur vulcanizable rubber composition according to claim 1 wherein said rubber is natural rubber, synthetic polyisoprene or a mixture thereof.

3. A rubber composition according to claim 2 wherein said rubber is natural rubber.

4. A rubber composition according to claim 1 wherein said mixture of zinc salts is a mixture of (i) one or more zinc salts of aliphatic carboxylic acids containing 8 to 10 carbon atoms and (ii) a zinc salt of benzoic acid, 2-methylbenzoic acid or 2-chlorobenzoic acid.

5. A rubber composition according to claim 4 wherein the molar ratio of said one or more zinc salts of aliphatic carboxylic acids to said zinc salt of benzoic acid, 2-methylbenzoic acid or 2-chlorobenzoic acid is in the range of 0.6:0.4 to 0.8:0.2.

6. A rubber composition according to claim 5 wherein said zinc salt of benzoic acid, 2-methylbenzoic acid or 2-chlorobenzoic acid is a zinc salt of benzoic acid.

7. A rubber composition according to claim 1 wherein said compound of the formula (I) is a compound wherein $Q_1$ and $Q_2$ are the same, n is 1, and D is a divalent group containing 1 to 18 carbon atoms and containing only carbon and hydrogen atoms.

8. A rubber composition according to claim 7 wherein $B=B_1=$oxygen and $R_1=R_2=R_3=$H.

9. A rubber composition according to claim 8 wherein said compound of the formula (I) is 1,3-bis(citraconimidomethyl)benzene.

10. A vulcanizate of a rubber composition according to claim 1.

11. A vulcanizate according to claim 10, said vulcanizate being the vulcanization reaction product of (a) natural rubber and (b) first and second anti-reversion agents, said first anti-reversion agent being a mixture of (i) one or more zinc salts of $C_8$-$C_{10}$ aliphatic carboxylic acids and (ii) one or more zinc salts of monocyclic aromatic carboxylic acids selected from the group consisting of benzoic acid, 2-methylbenzoic acid and 2-chlorobenzoic acid, wherein the molar ratio of (i) to (ii) is from about 0.6:0.4 to about 0.8:0.2 and, said second anti-reversion agent being 1,3-bis(citraconimidomethyl)benzene.

12. A tire having a multiple ply carcass, said carcass having a plurality of cords of essentially inextensible high modulus material embedded in a rubber matrix, the rubber of said matrix being a vulcanizate of a rubber composition according to claim 1.

13. A composition according to claim 1, said composition further containing stearic acid and zinc oxide as cure activators.

14. A composition according to claim 1, wherein:
   (a) said rubber is natural rubber, synthetic polyisoprene or a mixture thereof;
   (b) said mixture of zinc salts is a mixture of (i) one or more zinc salts of aliphatic carboxylic acids containing 8 to 10 carbon atoms and (ii) a zinc salt of benzoic acid, 2-methylbenzoic acid or 2-chlorobenzoic acid; and
   (c) said compound of the formula (I) is 1,3-bis(citraconimidomethyl)benzene.

* * * * *